United States Patent [19]
Adams et al.

[11] Patent Number: 6,010,397
[45] Date of Patent: Jan. 4, 2000

[54] METHODS OF PROCESSING BIVALVE MOLLUSCS

[75] Inventors: Thomas Mayne Adams, County Limerick; John Martin Holland; John Joseph Murphy, both of County Cork, all of Ireland

[73] Assignee: Gearhies Investments Limited, County Cork, Ireland

[21] Appl. No.: 08/974,485

[22] PCT Filed: May 14, 1996

[86] PCT No.: PCT/IE96/00030

§ 371 Date: Nov. 19, 1997

§ 102(e) Date: Nov. 19, 1997

[87] PCT Pub. No.: WO96/36236

PCT Pub. Date: Nov. 21, 1996

[30] Foreign Application Priority Data

May 19, 1995 [IE] Ireland ..................................... 950363

[51] Int. Cl.[7] .................................................. A22C 29/04
[52] U.S. Cl. .................................. 452/13; 452/12; 452/14
[58] Field of Search ................................. 452/12, 13, 14, 452/1, 19

[56] References Cited

U.S. PATENT DOCUMENTS

| | | | |
|---|---|---|---|
| 477,134 | 6/1892 | Mac Queen | 452/12 |
| 3,988,805 | 11/1976 | Martin | 452/14 |
| 4,141,114 | 2/1979 | Carlson | 452/14 |
| 4,688,679 | 8/1987 | Lindgren | 452/1 |
| 4,924,555 | 5/1990 | Gifford | 452/14 |
| 5,261,854 | 11/1993 | Eiriksson | 452/19 |

*Primary Examiner*—Willis Little
*Attorney, Agent, or Firm*—Kevin C. Hooper; Robert J. Lipka; Bryan Cave LLP

[57] ABSTRACT

A method of processing bivalve molluscs comprises filling a basket-like container (11) with the bivalve molluscs and vibrating the bivalve molluscs within the container (11), thereby inducing them to close tightly under stress and compacting them together. A lid (12) is closed to maintain the compact configuration of the bivalve molluscs, which are cooked by immersing the container into boiling seawater, before being removed and plunged into chilled water to halt the cooking process. The bivalve molluscs are then blast frozen. Because the shells of the bivalve molluscs are tightly closed and better compaction is achieved by vibrating the bivalve molluscs than by compressing them into the container (11), the shells are unable to open and the internal juices are retained within the shells throughout the cooking, chilling and freezing steps, thereby resulting in processed bivalve molluscs having greatly improved organoleptic qualities upon thawing.

21 Claims, 2 Drawing Sheets

METHODS OF PROCESSING BIVALVE MOLLUSCS

TECHNICAL FIELD

This invention relates to methods of processing bivalve molluscs, in particular to methods of processing involving heat treatment in which it is desirable to maintain the shells of the bivalve molluscs in a closed position.

BACKGROUND ART

Bivalve molluscs present particular difficulties for processors for reasons which are based on a number of factors. After bivalve molluscs are harvested from the sea and before they are cooked, they must generally be cleaned. For some bivalve molluscs, the process of removing byssus (or "debyssing") is also involved if the bivalve molluscs are to be acceptable to consumers. When bivalve molluscs have been removed from sea water, their storage life is limited, particularly after they have been debyssed. It is difficult to keep bivalve molluscs alive in a frozen or chilled state, but at the same time the bivalve molluscs must be kept alive until they are cooked if a high quality cooked product is to be obtained.

Accordingly, methods have been proposed for cooking and subsequently freezing the bivalve molluscs as soon as they have been removed from sea water (or shortly afterwards). When bivalve molluscs are heated, however, their shells open and their internal juices are lost. Since most of the taste and flavour of the bivalve molluscs is attributable to the internal juice, this presents a major disadvantage in cooking bivalve molluscs. It is highly preferred to cook the bivalve molluscs while maintaining the shell in a closed state so that the meat is cooked in the juices within the shell. The problems resulting from the opening of the shells are exacerbated because not only is the internal juice lost, but also the cooking medium robs the meat of much of its own flavour (bivalve molluscs are generally cooked in water or steam).

EP-A-0 242 183 describes a process for packing and treating mussels or other bivalve seafood wherein the bivalves are arranged in one or more layers in a heat-shrinkable plastics envelope. The bivalves are vacuum packed within the envelope and the envelope is preferably heat shrunk during vacuum packing. Thus, the bivalves are sealed within a plastics envelope in a closed state which allows them to be heated for partial or total cooking, followed by freezing. This process is disadvantageous because of the necessity of arranging the mussels in one or more layers within a plastics envelope or between two sheets of plastics material, and of carrying out the additional steps of vacuum packing and heat sealing the envelope or plastics sheets with the mussels inside.

Because the mussels are provided to the consumer vacuum packed in the envelopes within which they were cooked, envelopes must be prepared with individual portions of mussels inside, which slows down the process considerably and which leads to additional problems when the method is used in a mass processing facility.

EP-A-0 094 362 describes a process in which mussels are provided in a container with perforated walls and having internal perforated tubes. The container has a lid which can be screwed downwards in order to compact the mussels and inhibit them from opening. This container is placed in a pressurised cooking vessel (e.g. an autoclave) and the mussels are cooked in water or juice. The cooked mussels are frozen within the container and then removed. The juice in which the mussels were cooked is preferably frozen and supplied with the mussels as flavouring or cooking liquor (or it can be used in the preparation of mussel soup).

Although this method appears to more suitable for bulk processing of mussels than the method described in EP-A-0 242 183, the compaction achieved by screwing the lid onto the container is not sufficient to prevent the mussels from opening. This is recognised in the specification of EP-A-0 094 364, which states that the lid serves the dual purpose of partially preventing the opening of the mussels, and of immersing the mussels below the cooking water or juice.

In any event, the fact that juice is lost from the shells is considered in the specification to be compensated for by retaining and freezing the cooking juice (which includes the internal juices of the mussels after cooking) and supplying the frozen cooking juice with the frozen mussels for use in reheating or further cooking the mussels, to give back the lost flavour. Thus, it is stated that "the processing juices are reserved which means that no flavour is lost." Nevertheless, the fact that the shells are allowed to open partially means that the cooking medium robs the meat of some of its flavour. By providing juice or flavoured water as the original cooking liquor, this effect is reduced somewhat, but if the juice is not retained and frozen for supply with the mussels, then this flavour is lost completely. In any event, the organoleptic properties of the mussels will suffer if both the internal juices and the meat flavour are lost during the cooking process, irrespective of what cooking medium is used by the final consumer in the reheating or further cooking of the mussels before consumption.

Thus, it is an object of the invention to provide a process in which bivalve molluscs can be processed in bulk quantities and during which the shells remain closed. It is another object to provide a simpler and cheaper process than the processes known in the prior art, and it is yet a further object of the invention to provide bivalve molluscs having better organoleptic qualities than those produced by known processing methods.

Another object of the invention is the production of a batch of frozen cooked bivalve molluscs which are separated from one another. The problem to be overcome is that bivalve molluscs, when cooked in bulk in water or steam, tend to stick together when immediately frozen thereafter, due to the water retained on the surface of the shells.

Further advantages and/or objects of the invention will become clear by the following description thereof.

DISCLOSURE OF INVENTION

The invention provides a method of processing bivalve molluscs comprising the steps of vibrating a plurality of bivalve molluscs within a container and thereby compacting them together, and subjecting said bivalve molluscs to heat treatment while maintaining the bivalve molluscs in a compact configuration within the container so as to prevent the bivalve molluscs from opening during the heat treatment.

It has been found that vibration of the bivalve molluscs within the container causes them to settle into their most compact configuration and it minimises the free space around the bivalve molluscs. Thus, each mollusc is prevented from opening by the presence of its neighbours or the walls of the container.

Furthermore, the bivalve molluscs close tightly when they undergo any type of shock, so the vibration of the bivalve molluscs has the added effect of putting them into a state in which they are not going to open spontaneously, and would, in fact, be difficult even to prise open.

In the prior art method, compression of the bivalve molluscs from above merely stops the bivalve molluscs from shifting position or from floating. Whatever free space was present when the container was filled with the bivalve molluscs remains and is not eliminated by compaction and this allows some or all of the bivalve molluscs to at least partially open and release their internal juices. In any event, the external compaction provided by screwing a lid downwards onto a container full of bivalve molluscs can only be effected to a limited extent because of the possibility of cracking the shells of the bivalve molluscs, thereby rendering the product totally worthless. The fragility of the shells under a compressive force is recognised in EP-A-0 242 183, which warns against the risks involved in vacuum packing more than one layer of mussels because of the dangers of the shells breaking. This is of particular concern when rope cultured mussels (which have thinner shells than ground mussels) are used.

It will also be appreciated that the method according to the invention is far more efficient and less labour intensive than the vacuum pack method, as the number of bivalve molluscs which can be processed in a batch is not limited by the requirements of an individual consumer. In the vacuum pack method, the mussels must be separated into groups of, for example, 100–110 mussels (or 1 kg approx.) per pack, whereas according to the present invention, the container can be filled with one hundred kilograms or more of bivalve molluscs per batch, if desired.

Accordingly, the disadvantages and limitations of the prior art methods are overcome and the result is a product which retains all of its internal juices throughout heat treatment and possesses organoleptic characteristics which are greatly improved over the products of comparable prior art methods.

Preferably, the method comprises the additional step of halting the heat treatment of the bivalve molluscs by immersing the heated bivalve molluscs within the container in cold water.

In order to speed up processing and improve control of the temperature profile of the bivalve molluscs during processing, the cooking which is effected during heat treatment (and which may continue after the heat source is removed if the bivalve molluscs retain sufficient heat), can be stopped quite effectively by immersing the heated bivalve molluscs, still in their container, in a cooling medium, preferably cold water. Further alternatives will be apparent to the skilled person, such as spraying the bivalve molluscs with a cooling agent or blasting them with cold air.

In a preferred embodiment, the bivalve molluscs are removed from the cold water and allowed to drain at a stage when they still retain sufficient internal heat to evaporate any remaining water from the surfaces of their shells, thereby providing a cooled dried product.

A cooled dried product is often required if the product is to undergo further processing steps. By an appropriate choice of temperatures and times for the heat processing and cooling cycles, the bivalve molluscs may be removed from the cold water or other cooling medium while they retain sufficient internal heat to evaporate any remaining water from the shells after drainage.

By effecting the cooling and drying steps with the bivalve molluscs still retained in the container, a greater degree of sterility may be ensured. This is because a batch of bivalve molluscs within a container which is sterilised during heat treatment can be immediately immersed in sterile cold water and removed and allowed to dry. At no point during this process is there any opportunity for bacteria to infiltrate the mass of bivalve molluscs within the container. It is obviously highly advantageous to have a solid mass of cooled dried processed bivalve molluscs which have not been exposed to sources of possible bacterial contamination following heat sterilisation.

Most preferably, the method comprises the additional step of freezing the treated bivalve molluscs within the container, thereby providing processed frozen bivalve molluscs which have remained closed throughout processing.

By freezing the bivalve molluscs while they are still within their container, the product thereby provided is frozen and, as pointed out above, sterile. If the bivalve molluscs are dried (either by evaporation of cold water due to internal heat or otherwise), then the shells will not stick together during freezing and the mass of frozen bivalve molluscs can be emptied from the container in the frozen state without any need for a separation step. This means that packaging can take place immediately, and a free-flowing batch of frozen separated bivalve molluscs is obtained.

Although individually frozen mussel meat is known, this meat is usually dry and tasteless, since the individual freezing of the portions of meat involves the loss of much of the natural juice. The invention provides, for the first time, frozen bivalve molluscs with all juices intact.

The number of bivalve molluscs in an individual package can be freely chosen without prejudice to the size of the batch processed, or to the speed of processing, unlike the aforementioned vacuum packing method in which: (a) packaging must take place prior to all subsequent steps, (b) the bivalve molluscs must be laid out in layers in a controlled manner, and (c) the choice of packaging method is restricted to vacuum packing combined with heat sealing. Additionally, the vacuum packing method limits not only the choice of method used to package the bivalve molluscs, but also limits the choice of packaging materials (i.e. flexible, heat-sealable plastics or the like). According to the present invention, however, the frozen bivalve molluscs can be packaged using any suitable method and any suitable packaging material without any need to configure the frozen bivalve molluscs in layers.

Suitably, the heat treatment of the bivalve molluscs comprises immersing the bivalve molluscs in heated liquid.

Preferably, the liquid is selected from water, sea water and brine. Immersion of the bivalve molluscs in water, sea water or brine is an extremely cheap and highly controllable cooking method. According to the present invention, there is no necessity to use a pressurised cooking vessel, although the heat treatment of the bivalve molluscs may comprise cooking in steam, and optionally, the container may be enclosed in a sealed pressurised cooking vessel, if this is desired under any particular circumstances.

Preferably, therefore, the container is freely liquid permeable. Further, preferably, the container is of open lattice or basket construction.

It will be appreciated that the container can be chosen or designed for the most efficient cooking process available; it has been found, however, that a simple wire basket construction is particularly suitable where the container containing the bivalve molluscs is immersed in boiling water or sea water.

Preferably, the container is rigid, although alternative types of containers may become apparent to the skilled person for use in accordance with the present invention.

In a preferred embodiment, the compact configuration of the bivalve molluscs is maintained by covering the bivalve molluscs to hold them in position within the container.

As certain bivalve molluscs have a tendency to float if immersed in a liquid such as water or sea water, covering the bivalve molluscs by a lid designed to fit over the container or a weighted lid sitting on top of the bivalve molluscs will help to hold the compact configuration achieved by vibrating the bivalve molluscs within the container.

In a preferred embodiment, the bivalve molluscs are vibrated within the container as the container is being filled. This has been found to achieve a more efficient compaction than the vibration of a filled container. Additionally, the time which would be spent in separate filling and vibrating steps is reduced by vibrating during filling.

Preferably, the vibration is effected by vibrating the container.

The vibration of the container may comprise horizontal oscillations, vertical oscillations and rotational oscillations to and fro, or some other vibrational movement adapted to achieve the most effective compaction of the bivalve molluscs within the container.

In a preferred embodiment, the container is forced to oscillate with an amplitude of from 0.1 mm to 10 cm.

Suitably, the container is vibrated at a frequency of from 5 to 50 Hz.

Presently preferred mode of vibration is achieved using a vibrating bed which consists of a spring mounted table coupled to a motor which drives an off-center weight about an axis. The rotating weight causes the motor, and hence the table, to vibrate. The amplitude of vibration is controlled by tightening or loosening the supporting springs.

Any vibration will increase the tightness of packing and will tend to induce the bivalve molluscs to close tightly. The process can be optimised, however, by subjecting the bivalve molluscs to a buzzing vibration as the container is filled.

Various effective modes of vibration can be devised according to the nature of the bivalve molluscs (e.g. the average size and weight, the shape of the shells, etc). The size and type of container may also have a bearing on the mode of vibration selected.

The bivalve molluscs may be partially or fully cooked during the heat treatment step. Thus, they can be provided to kitchens and restaurants for complete cooking, or they can be provided to the consumer in a state such that only defrosting and heating is required before consumption. It will be appreciated that different heat treatment regimes are required depending on the customer for whom the product is intended.

Suitably, the bivalve molluscs are selected from mussels, oysters, clams, scallops and cockles.

Preferably, the method comprises the initial steps of detraumatising the bivalve molluscs after they are harvested and, where appropriate, debyssing the bivalve molluscs before filling them into the container.

The initial process (detraumatising and/or debyssing) may be required in order to provide a high quality product for the consumer. Generally, a mollusc which has been traumatised by harvesting should be detraumatised to allow the flesh to relax and the shell to close prior to cooking. Optionally, bivalve molluscs can undergo deputation and preferably they will be debyssed (if of the type where a byssus is grown).

In a preferred embodiment, the bivalve molluscs are mussels and the heat treatment comprises heating the bivalve molluscs to a temperature of 88–95° C. for a period of 80–100 seconds.

BRIEF DESCRIPTION OF DRAWINGS

The invention will be further described by the following description of an embodiment given by way of example only with reference to the accompanying drawings, in which.

MODES FOR CARRYING OUT THE INVENTION

Figure 1:
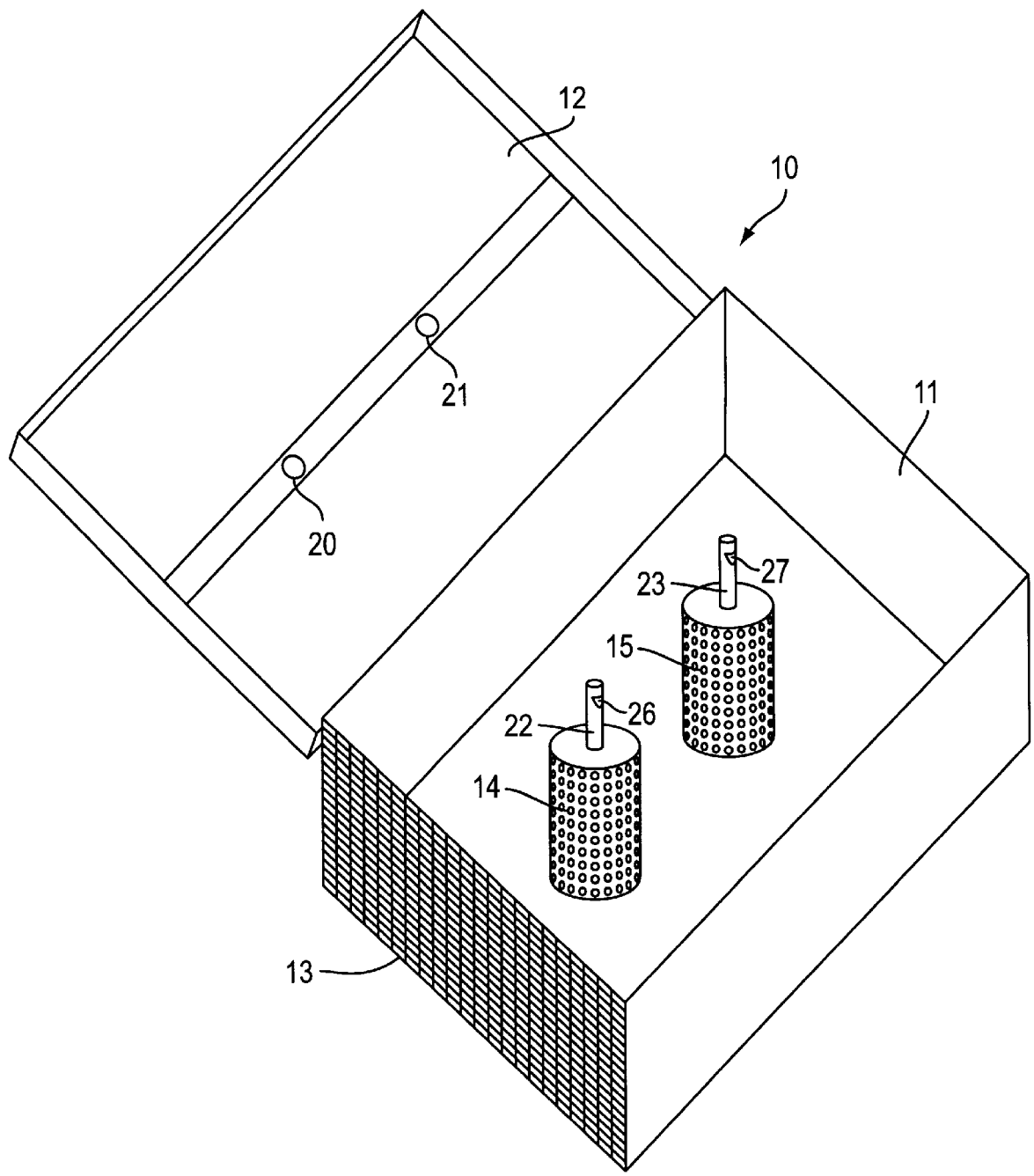
FIG. 1 is a perspective view of a container suitable for use in the method according to the invention.

In FIG. 1 there is illustrated, generally at 10, a container which is suitable for use in accordance with the invention and which was used in the following Examples. The container 10 comprises a food-grade stainless steel box 11 having a hinged lid 12 which forms a tight fit over the open top of box 11. The floor and walls of box 11, as well as the lid 12, are made of a strong lattice-work construction, as shown in the case of wall 13. This construction allows water to freely permeate bivalve molluscs which are enclosed by container 10, when container 10 is immersed in water. It also allows rapid drainage of water from container 10 when it is removed from immersion.

Figure 2:
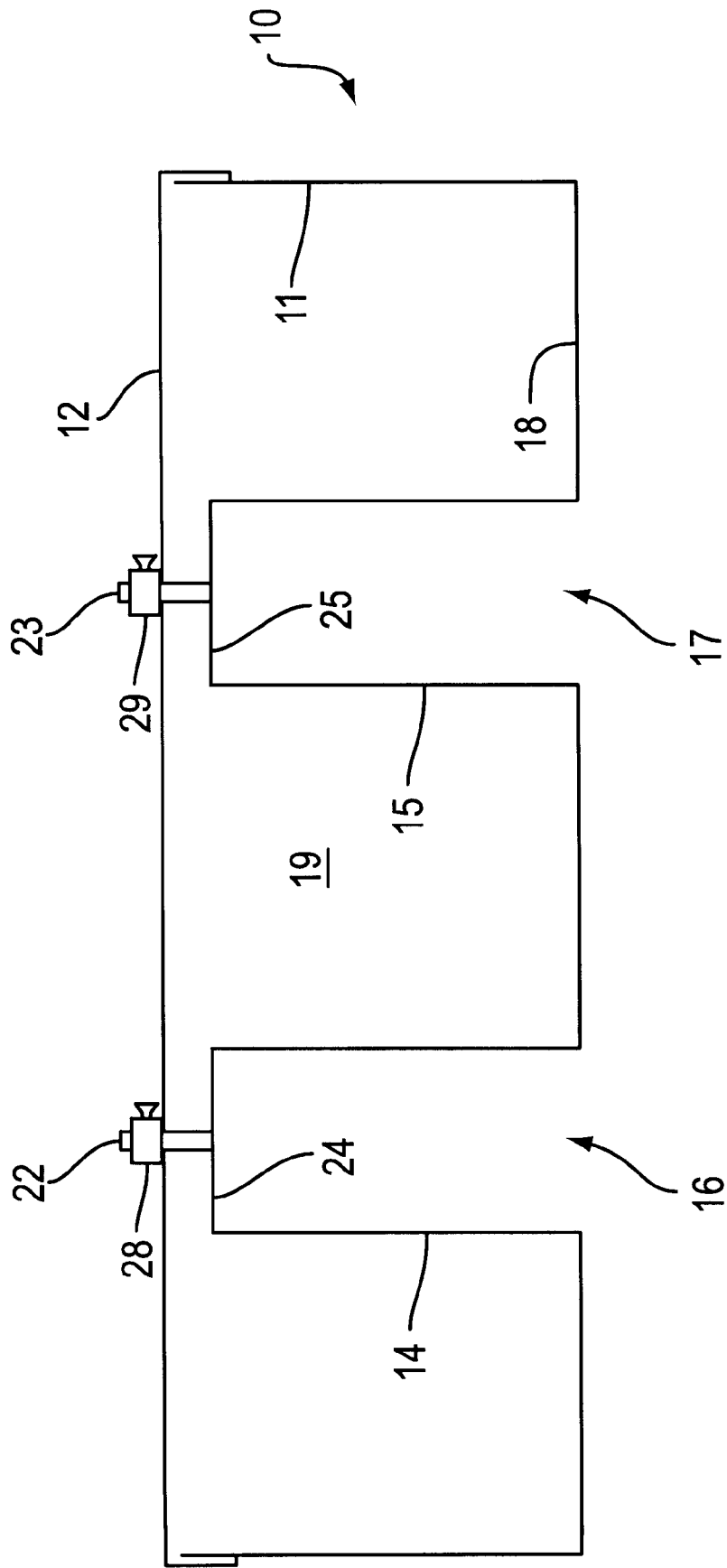
FIG. 2 is a cross-sectional elevation of the container of FIG. 1 in the closed condition.

As better illustrated in FIG. 2, a pair of hollow cylinders 14,15, which are open at one end 16,17 thereof extend upwards through the floor 18 of box 11. As shown in FIG. 1, cylinders 14,15 are perforated over their curved surfaces. Thus, when container 10 is immersed into a cooking medium, for example boiling water or steam, the cooking medium can penetrate more quickly into the centre of box 11. This ensures that bivalve molluscs held within interior 19 (FIG. 2) of container 10 (when container 10 is closed) are heated more evenly and rapidly upon immersion into the medium. This provides more reliable temperature control and monitoring, and ensures more predictable cooking results for all of the bivalve molluscs.

The lid 12 is provided with a pair of apertures 20,21. When lid 12 is closed over box 11, apertures 20,21 fit over a pair of projecting members 22,23 extending upwards from tops 24,25 of cylinders 14,15, respectively. Each projecting member 22,23 is provided with a notch 26,27 respectively which is adapted to co-operate with a clamping member 28,29 (FIG. 2) in order to secure the lid 12 firmly in place. The projecting members 22,23 and clamping members 28,29 can be replaced by any conventional fastening means to hold the lid 12 firmly in place. By holding lid 12 firmly in place on top of bivalve molluscs (not shown) which are tightly packed by vibration in the interior 19 of box 11, one ensures that the bivalve molluscs remain closed and remain in their tightly packed configurations inside container 10 throughout the heat treatment step(s).

The invention will be further illustrated by the following Examples.

EXAMPLE 1

100 kg of live fanned mussels were detraumatised in holding tanks in sea water for a period of 36 hours immediately following harvesting. The mussels were then thoroughly cleaned and de-byssed in conventional manner.

The washed de-byssed mussels were then immediately loaded via a conveyor belt into the container illustrated in FIG. 1. The container was mounted on a vibrating bed which caused the container to vibrate at a frequency of 10.8 Hz with an amplitude of approximately 1 mm.

The vibrating bed consists of a spring mounted table coupled to a motor which drives an off-center weight about an axis. The rotating weight causes the motor, and hence the table, to vibrate. The amplitude of vibration is controlled by tightening or loosening the supporting springs.

The vibration was maintained continuously as the mussels were being filled into the container. The vibration causes the mussels, when inside the container, to clamp tightly shut (the normal reaction of a bivalve mollusc when it is subjected to a violent stress).

The mode of vibration does not remain constant during filling since the vibrating mass increases considerably. The container moves more violently at the beginning and less violently as it fills. Even when nearly full, the vibration is quite vigorous. In the later stages of filling, however, there is little displacement of the container but the vibration causes a buzzing effect. The exact mode of vibration which achieves the best compaction can be optimised by setting the table so that in a 100 kg batch, the shaking movement reduces to a humming or buzzing vibration during the filling of the last 5–10 kg. With alternative vibration apparatus it may be possible to achieve a humming vibration over the entire filling process, i.e. the vibrations may be adjusted continually to take account of the increasing mass.

A number of temperature probes were embedded within the mass of mussels as the container was filled. These probes were connected to a display unit which is used to continually monitor the core temperature of the mussels (i.e. the temperature of the shells of the mussels in the middle of the tightly packed mass).

When the container was completely filled with mussels, the lid was placed in position and retained by clamping members, thereby ensuring that the position, orientation and configuration of the mussels achieved by vibration was maintained.

The container was then lowered into a conventional cooking vessel containing sea water which had been heated to boiling point and which was maintained at that temperature.

The duration of the immersion of the container into the boiling sea water depends on the desired degree of cooking of the mussels, as well as on factors such as the quantity of boiling water, the dimensions of the container, and the quality of the mussels.

In the present Example, the mussels were to be cooked substantially to completion (i.e. such that they would only require reheating at a later stage before consumption). This requires a core temperature of 91° C. or more to be maintained for a period of 90 seconds. In order to achieve such core temperatures, the mussels were immersed for a period of 5 minutes, the time being determined by monitoring the temperature read-out from the temperature probes to ensure that the required temperature of 91° C. for 90 seconds was achieved.

The mussels were then removed from the cooking vessel and plunged into chilled water at 1° C. until the core temperature was reduced from 91° C. to 35° C., at which point the container was removed from the cold water. This effectively halted the cooking process but maintained sufficient heat within the mussels to ensure that they dried off completely by evaporation. The container allows retained water to drain away when it is removed from the cold water and it also allows evaporated water to escape (the latent heat of vaporisation was supplied by the internal heat retained by the mussels at 35° C.). At this stage, the container was filled with cooked, dried, tightly packed, closed mussels.

The container was then transported to a blast freezer where the core temperature was reduced to −28° C. as quickly as possible. Because of the lack of surface water on the shells of the mussels, the frozen mussels did not stick together upon freezing. This allowed the lid of the container to be removed and the mussels to be emptied from the container and then packed in the desired quantities. Because the mussels remained tightly closed and packed together throughout the process, no possibility arose of bacterial contamination occurring between the sterilising (i.e. cooking) step and the blast freezing step. Accordingly, the frozen product was completely sterile.

The mussels produced according to the Example are suitable for retail sale as frozen food. Individual frozen mussels thus produced can be removed from a package and heated rapidly before consumption. The tightly closed mussels retain all of their natural juices and thus have highly improved organoleptic qualities when compared to the mussels cooked using the pressurised container of the prior art.

A further and unforeseen advantage arising from the process is that more than 90% of the mussels, when opened after reheating, have separated entirely from their shells. Generally, upon cooking mussels, the meat remains attached to the shell via the aductor muscle. For consumption purposes, the meat must be pulled away from the aductor muscle, which remains attached to the shell, and this can lead to some difficulty when eating mussels. The mussels prepared according to the present Example, however, were far easier to remove from the shells as the aductor muscles, in the vast majority of cases, were separated from the shell and were integral with the rest of the meat.

This separation of the aductor muscle with the remainder of the meat from the shells is particularly advantageous in the case of the commercial production of cooked mussel meat. The aductor muscle only forms a minor portion of the mass of meat within the shell. In the case of individual consumption of mussels, the amount of meat wasted by the adhesion of the aductor muscle to the shell is minimal. For commercial purposes, however, the production of mussels which are separated entirely from the shell means that even this minimal loss is eliminated. The loss might be estimated at, for example, 1–2% of the total weight of mussel meat, and it will be appreciated that this leads to a considerable saving in cases where, as in the present Example, batches of 100 kg of bivalve molluscs are processed at a single time.

In reality commercially produced mussel meat is shaken from the shells after cooking and up to 30% of the meat may remain in the shells. In addition, the meat obtained is often damaged or broken. Upon thawing, the mussels produced by the present invention opened spontaneously, and the semi-frozen meat and juices were free within the shell. This may clearly lead to significant savings, in terms of time and money, when producing mussel meat on a large scale, as 100% of the meat and juices can be removed from the shells without effort, and without damage. In effect, one can obtain a "parcel" of frozen meat and juices, which separates freely from the open shell.

The reasons for the separation of the aductor muscle during processing according to the present invention is not fully understood, but it may be supposed, without wishing to be bound by any theoretical explanation, that the aductor muscle is experiencing strains for which it is unsuited, either during the vibration procedure, or during subsequent steps. For example, the fact that the shell is forced to remain shut throughout processing means that the natural tendency to open upon heating is completely inhibited (unlike the partial inhibition in the prior art processes). Furthermore, when the mussels are frozen, they are frozen with all of the internal juices therewithin. It may be that the expansion of these juices upon freezing or upon thawing increases the pressure within the shell or the strain upon the aductor muscle. In any event, it is a somewhat surprising and highly advantageous technical result which arises directly from the method of the invention.

EXAMPLE 2

The above process was substantially repeated but was used to prepare "blanched" mussels. This required a core temperature of 80° C. to be maintained for 60 seconds. The mussels were removed from the boiling water 20 seconds after the core temperature had reached and passed 80° C. The mussels only cooled down slowly upon removal and a temperature in excess of 80° C. was thus maintained for the remaining 30 seconds after the mussels were removed from the boiling water. The mussels were plunged, 60 seconds after the initial immersion in boiling water, into chilled water at 1° C., and the process continued as previously described in Example 1.

The blanched mussels thus produced are suitable for caterers such as restaurants and hotels who wish to complete the cooking process to order or for certain recipes. It allows caterers to purchase, store and subsequently prepare frozen mussels which are equivalent in quality to freshly harvested mussels. This possibility was not previously available for caterers who are situated at a point remote from a mussel producing coast line.

EXAMPLE 3

The process according to Example 1 was substantially repeated using clams. The clams were filled into a container which was vibrated as herein described and they were then fully cooked (i.e. in a similar manner to the mussels in Example 1). A full cooking regimen required maintaining a core temperature of 91° C. for 90 seconds.

The process as herein exemplified can be adapted to suit individual requirements. The skilled person will be aware of (or can easily ascertain) the length of time for which a specific core temperature must be maintained for any given mollusc in a particular situation, and the immersion cycle can be adjusted to achieve this temperature for any suitable apparatus. In certain cases, it may be appropriate to maintain the immersion of the container in boiling water throughout the cooking cycle before immediate plunging into chilled water, while in other cases it may be desirable to remove the container for a portion of the cooking cycle, the retained heat of the bivalve molluscs thereby allowing cooking to continue when removed from the boiling water.

We claim:

1. A method of processing bivalve molluscs comprising the steps of introducing a plurality of bivalve molluscs into a container vibrating the container and thereby compacting the molluscs together, and subjecting said molluscs to heat treatment having first covered the molluscs to maintain them in a compact configuration within the container so as to prevent the molluscs from opening during the heat treatment.

2. A method according to claim 1, comprising the additional step of halting the heat treatment of the bivalve molluscs by immersing the heated bivalve molluscs within the container in cold water.

3. A method according to claim 2, wherein the bivalve molluscs are removed from the cold water and allowed to drain at a stage when they still retain sufficient internal heat to evaporate any remaining water from the surfaces of their shells, thereby providing a cooled dried product.

4. A method according to claim 1 further comprising freezing the treated bivalve molluscs within the container, thereby providing processed frozen bivalve molluscs which have remained closed throughout processing.

5. A method according to claim 1 wherein the heat treatment of the bivalve molluscs comprises immersing the bivalve molluscs in heated liquid.

6. A method according to claim 5, wherein the liquid is selected from water, sea water and brine.

7. A method according to claim 1 wherein the heat treatment of the bivalve molluscs comprises cooking in steam.

8. A method according to claim 1 wherein the container holding the bivalve molluscs is enclosed in a sealed pressurized cooking vessel during heat treatment.

9. A method according to claim 1 wherein the container is freely liquid permeable.

10. A method according to claim 9, wherein the container is of open lattice or basket construction.

11. A method according to claim 1 wherein the container is rigid.

12. A method according to claim 1 wherein the compact configuration of the bivalve molluscs is maintained by covering the bivalve molluscs to hold them in position within the container.

13. A method according to claim 1 wherein the bivalve molluscs are vibrated within the container as the container is being filled.

14. A method according to claim 1 wherein the vibration is effected by vibrating the container.

15. A method according to claim 14, wherein the container is forced to oscillate with an amplitude of from 0.1 mm to 10 cm.

16. A method according to claim 14 wherein the container is vibrated at a frequency of from 5 to 50 Hz.

17. A method according to claim 1 wherein the bivalve molluscs are partially cooked during the heat treatment step.

18. A method according to claim 1 wherein the bivalve molluscs are fully cooked during the heat treatment step.

19. A method according to claim 1 wherein the bivalve molluscs are selected from mussels, oysters, clams, scallops and cockles.

20. A method according to claim 1 comprising the initial steps of detraumatising the bivalve molluscs after they are harvested and, where appropriate, debyssing the bivalve molluscs before filling them into the container.

21. A method according to claim 1 wherein the bivalve molluscs are mussels and the heat treatment comprises heating the mussels to a temperature of 88–95° C. for a period of 80–100 s.

* * * * *

UNITED STATES PATENT AND TRADEMARK OFFICE
CERTIFICATE OF CORRECTION

PATENT NO. : 6,010,397
DATED : January 4, 2000
INVENTOR(S) : Thomas Mayne Adams, et al.

It is certified that error appears in the above-identified patent and that said Letters Patent is hereby corrected as shown below:

On the title page, under References Cited, U.S. Patent Documents, please add the following :

4,255,834      3/1981      Lambert.

In addition, please also add the following foreign references:

0 398 667 A1  11/1990     Europe 0 242 183 A1  10/1987     Europe 0 094 362 A1  11/1983     Europe.

Signed and Sealed this

Ninth Day of January, 2001

Attest:

Attesting Officer

Q. TODD DICKINSON
Commissioner of Patents and Trademarks